United States Patent [19]
Murphy, Jr. et al.

[11] Patent Number: 5,493,086
[45] Date of Patent: Feb. 20, 1996

[54] MONITORING AND REGULATING DEVICE FOR A FLUID SUCH AS ENGINE OIL

[75] Inventors: Frank W. Murphy, Jr., Tulsa; Eric Miller, Broken Arrow; David Nunneley, Broken Arrow; Charles R. Lawrence, Broken Arrow, all of Okla.

[73] Assignee: Murphy Management Inc., Tulsa, Okla.

[21] Appl. No.: 980,855

[22] Filed: Nov. 24, 1992

[51] Int. Cl.⁶ ................................................. H01H 35/18
[52] U.S. Cl. ..................... 200/84 R; 73/311; 137/399; 200/81.4; 340/625
[58] Field of Search ............................... 73/308, 313, 311, 73/317, 454; 200/308, 61.2, 84 R, 81.4; 137/399, 400, 434, 448; 340/625, 623; 116/229; 307/118

[56] References Cited

U.S. PATENT DOCUMENTS

| | | |
|---|---|---|
| 2,325,582 | 8/1943 | Andersen . |
| 2,690,484 | 9/1954 | Buchtenkirch . |
| 3,134,866 | 5/1964 | Murphy et al. . |
| 3,339,519 | 9/1967 | Taylor et al. . |
| 3,405,687 | 10/1968 | Ruter ........................... 119/78 |
| 3,610,854 | 10/1971 | Greene ........................ 200/84 R |
| 3,931,485 | 1/1976 | Spielfiedel .................. 200/84 R |
| 3,946,625 | 3/1976 | Miyazaki ..................... 73/311 |
| 3,953,845 | 4/1976 | Kress . |
| 4,038,507 | 7/1977 | Murphy, Jr. et al. . |
| 4,395,605 | 7/1983 | Weston ........................ 200/84 C |
| 4,600,820 | 7/1986 | Bruder et al. . |
| 4,848,151 | 7/1989 | Bruder et al. . |
| 5,023,806 | 6/1991 | Patel . |
| 5,030,803 | 7/1991 | Yarbrough .................. 200/84 C |
| 5,294,917 | 3/1994 | Wilkins ....................... 340/625 |

Primary Examiner—Gerald P. Tolin
Attorney, Agent, or Firm—Fulbright & Jaworski

[57] ABSTRACT

An engine oil regulating device may monitor and regulate a fluid level for stationary engines or compressors for gravity feed and pressurized oil applications. Oil may be received in a float chamber that may have a safety shutdown float and an oil level regulating float. The engine oil regulating device may also include a safety shutdown mechanism to actuate an alarm and/or a shutdown switch such as an ignition cut-off switch. The safety shutdown mechanism may be configured as a single switch or a plurality of switches. A two switch safety shutdown mechanism may utilize a side-by-side layout or a stacked layout. The safety shutdown mechanism may include a high-low level shutdown, low level shutdown only, or high level shutdown only. A testing mechanism such as a rotatable test knob assembly may be provided to test the safety shutdown mechanism. An engine oil level adjusting mechanism such as an adjustable threaded thumb valve orifice member may also be provided. The engine oil regulating device may also include a signal sending unit for sending a signal to a place away from the remote location. The signal may indicate an alarm due to an unsafe high and/or low fluid level without a shutdown, a normal fluid level, a safety shutdown due to an unsafe high and/or low fluid level, or a testing signal.

28 Claims, 12 Drawing Sheets

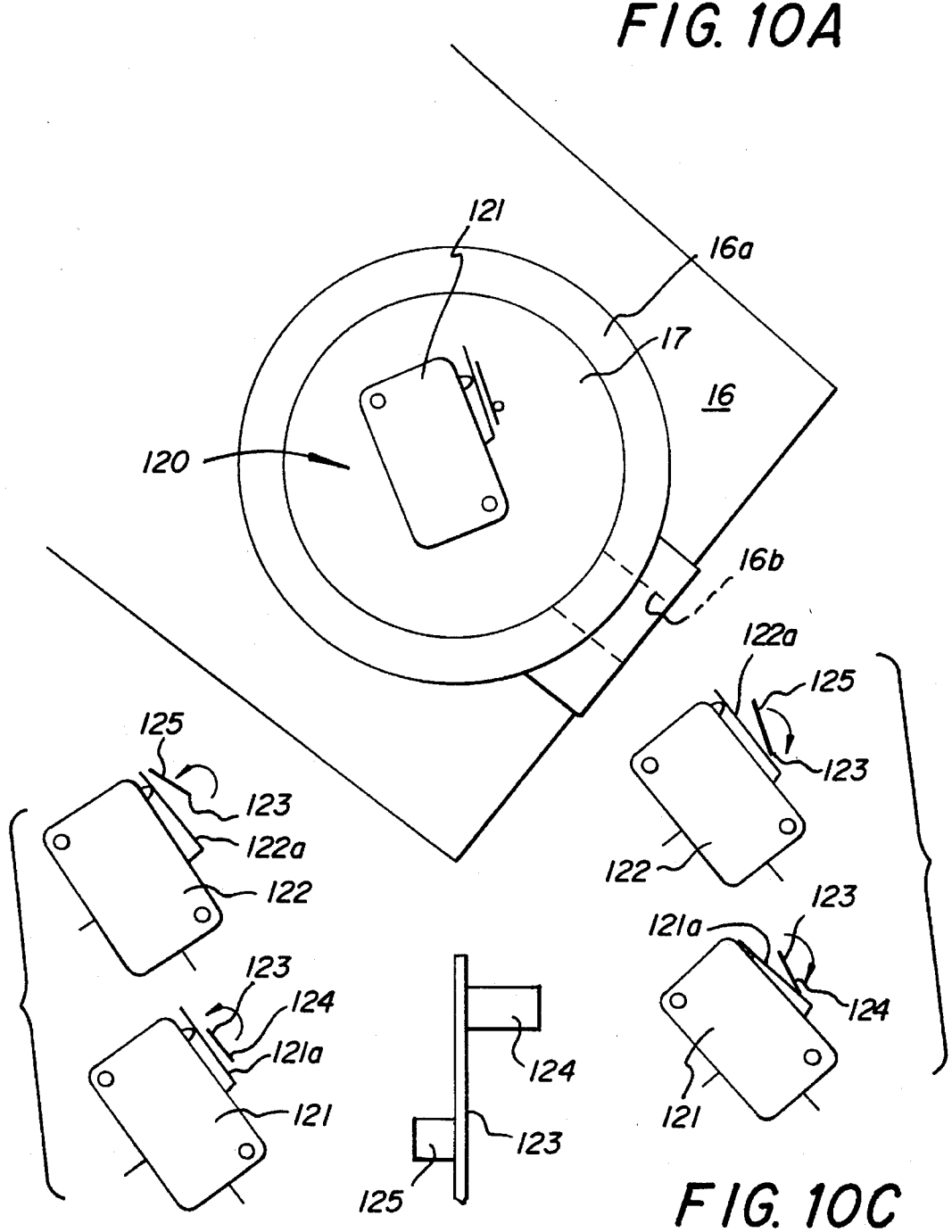

MONITORING AND REGULATING DEVICE FOR A FLUID SUCH AS ENGINE OIL

BACKGROUND OF INVENTION

1. Field of the Invention

The invention relates to a fluid level monitoring and regulating device, and more particularly to an engine oil regulating device having a safety shutdown mechanism and a testing mechanism for the safety shutdown mechanism.

2. Description of the Related Technology

Stationary oil field equipment, such as engines and compressors, are typically located in remote areas and are directly monitored on the occasions that oil field personnel are in the area. In connection with stationary oil field equipment there is a requirement for a combined device to automatically maintain the proper crankcase oil level and to automatically shut down the engine or compressor and/or actuate an alarm following the detection of an unsafe fluid level. Thus, it is necessary to detect the depletion of the usual gravity supply of oil below safe limits and take appropriate action. It may also be necessary to automatically shut down the engine or compressor and/or actuate an alarm upon detection of an excessively high fluid level.

In the field of stationary oil field equipment more frequent monitoring of oil field stationary equipment is desired without increasing the number of visits to the oil field. Thus, it is also necessary to provide an engine oil regulating device with a signal sending feature so the fluid level and/or automatic shutdown may be indicated at a place away from the remote location.

U.S. Pat. No. 4,038,507, the disclosure of which is expressly incorporated herein, discloses an oil level regulator and shutdown device for stationary engines and compressors. A single float provides both the monitoring and regulating functions. An oil level sight gage is also provided for a visual indication of the crankcase oil level.

U.S. Pat. No. 3,134,866 discloses a liquid level switch-gauge having an adjustable contact mechanism to sound an alarm, or shut down machinery, when the fluid level reaches a predetermined high or low point.

There exists a need for an engine oil regulating device which provides a visual indication of a crankcase oil level, regulates the crankcase oil level, and provides an automatic machine shutdown feature and/or an alarm feature in the event that an unsafe oil level is detected. There further exists a need for an engine oil regulating device with a testing mechanism for periodic testing of the automatic shutdown feature, and with a signal sending unit for sending an indication of conditions sensed at the oil field to personnel located away from the oil field.

SUMMARY OF THE INVENTION

It is an object of the invention to provide a fluid level monitoring and regulating device with a safety shutdown element responsive to a sensed condition.

It is also an object of the invention to provide an fluid level regulating device with a multiple float system including an fluid level regulating float and a safety shutdown float.

It is a further object of the invention to provide an fluid level regulating device with a safety shutdown testing element for periodic testing of the safety shutdown element with regard to both high and low fluid levels.

It is a further object of the invention to provide an fluid level regulating device with an fluid level visual indicator including a multicolored element showing safe and unsafe fluid levels.

It is a further object of the invention to provide an fluid level regulating device with an adjustable fluid level regulating element.

It is a further object of the invention to provide an engine oil level monitoring and regulating device that may be adapted for use with gravity feed oil reservoirs and pressurized oil reservoirs.

According to the invention, an engine oil regulating device monitors and regulates an oil level for oil field stationary engines or compressors. According to the preferred embodiment, oil is received in a float chamber that may have a safety shutdown float and an oil level regulating float.

Preferably, a safety shutdown mechanism actuates an alarm and/or a shutdown switch such as an ignition cut-off switch. The safety shutdown mechanism may be configured as a single switch or a plurality of switches. A two switch safety shutdown mechanism may utilize a side-by-side layout or a stacked layout. The safety shutdown mechanism may include a high-low fluid level shutdown capability, a low fluid level shutdown capability only, or a high fluid level shutdown only.

It is contemplated to provide an "ABS"-type engine oil regulator that actuates an alarm before shutdown on rising or falling fluid level. Typically, the fluid level necessary to effect a shutdown is insufficient to maintain the equipment, so damage to the equipment may result. The detection of an alarm before shutdown is advantageous, as a technician has the opportunity to inspect the equipment before a condition requiring shutdown exists, thereby minimizing the likelihood of damage to the equipment.

It is also advantageous to detect the depletion of oil in the crankcase and the resulting low oil level to prevent overheating and the possibility of the moving parts of the engine or compressor seizing. It is also advantageous to detect an unsafe high fluid level, as some water-cooled engines will develop leaks around internal seals and water will migrate into the crankcase. The entry of water into the crankcase raises the effective oil level and mixes the water with the oil, causing a nonlubricating and foaming solution which can be very destructive to the parts of an internal combustion engine.

Detection of an unsafe high fluid level is also desirable in the event that an operator or technician overfills the crankcase with oil. There is also the remote possibility that a closure valve of the engine oil regulating device may remain in the open position due to particle contamination. Such particle contamination may impair the operation of a closure valve, as the closure valve could remain in the open position and result in the crankcase overfilling with oil.

According to the preferred embodiment, a testing mechanism is provided for testing the safety shutdown mechanism. Preferably, an engine oil level adjusting mechanism with an adjustable threaded thumb valve orifice member is also provided. The engine oil regulating device may also include a signal sending unit for sending a signal to a place away from the remote location. The signal may indicate an unsafe high fluid level, an unsafe low fluid level, a normal fluid level, a safety shutdown due to an unsafe fluid level or a testing signal. Additional features will become apparent from the description of the preferred embodiment.

According to another embodiment of the invention, the engine oil regulating device may be provided with monitoring and regulating functions only. In other words, the engine oil regulating device may be manufactured without any safety shutdown mechanism. The device according to that embodiment is manufactured without any switching mechanism or switch housing.

BRIEF DESCRIPTION OF THE DRAWINGS

FIG. 10A shows a top view of a stacked two-switch embodiment of the safety shutdown switch mechanism according to the invention, in a rest position;

FIG. 10B shows a top view of the safety shutdown switch mechanism of FIG. 10A in activated position due to an unsafe high fluid level;

FIG. 10C shows a top view of the safety shutdown switch mechanism of FIG. 10A in an activated position due to an unsafe low fluid level;

FIG. 10D shows a partial side view of an actuator rod and switch actuator bars of the safety shutdown switch mechanism of FIG. 10A;

DETAILED DESCRIPTION OF THE PREFERRED EMBODIMENT

Figure 1:
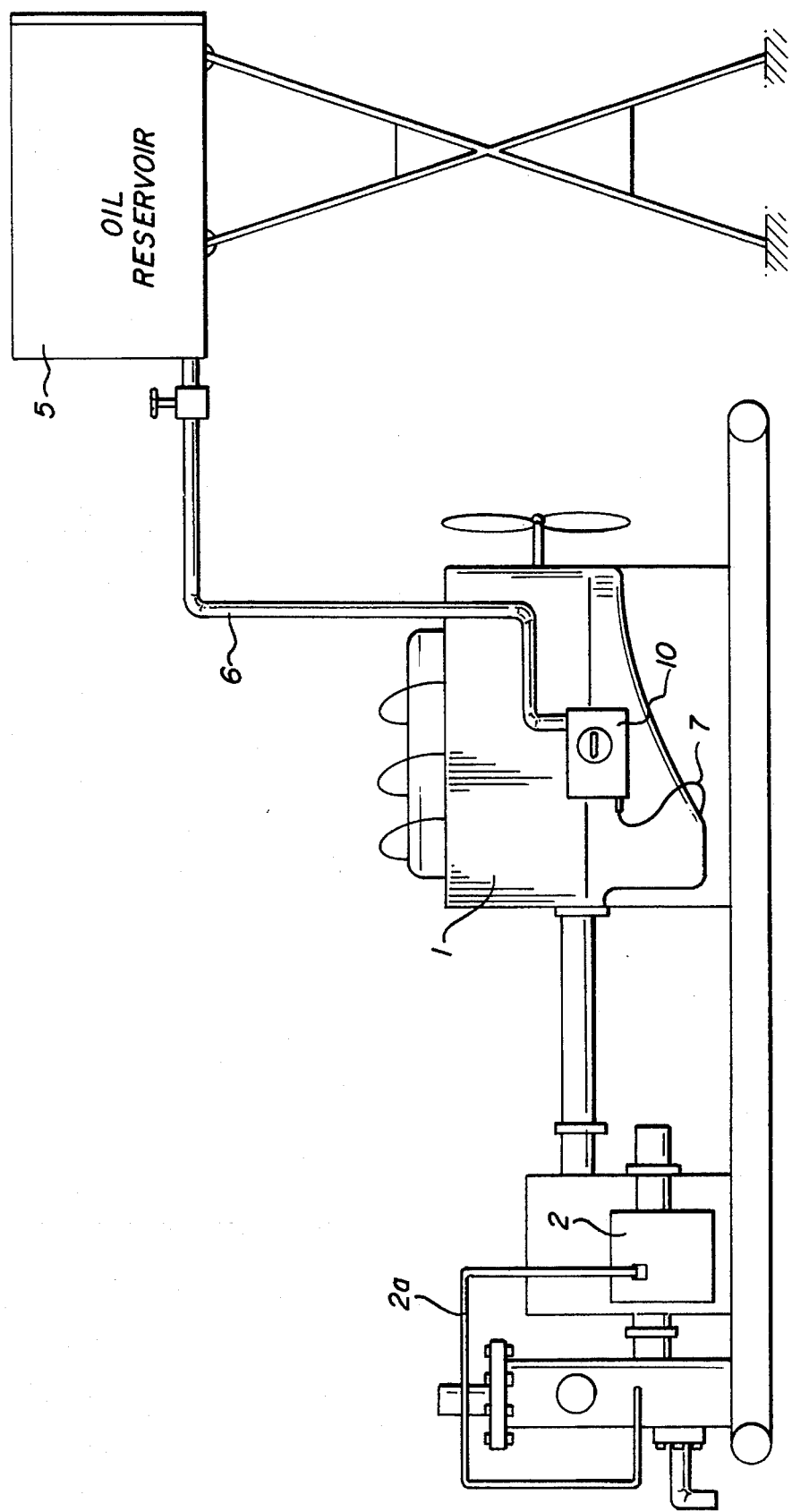
FIG. 1 shows a side view of a stationary engine system with an engine oil regulating device according to the invention configured for a gravity feed oil supply.

FIG. 1 shows a stationary engine system for use with an engine oil regulating device 10, which is described in detail below. The stationary engine system includes a stationary engine 1, a compressor 2 with a bleed air supply line 2a and a gravity feed oil reservoir 5. Engine oil regulating device 10 includes an inlet that may be connected to oil reservoir 5 by flow passageway 6 and an outlet that may be connected to the stationary engine crankcase by flow passageway 7.

Figure 2:
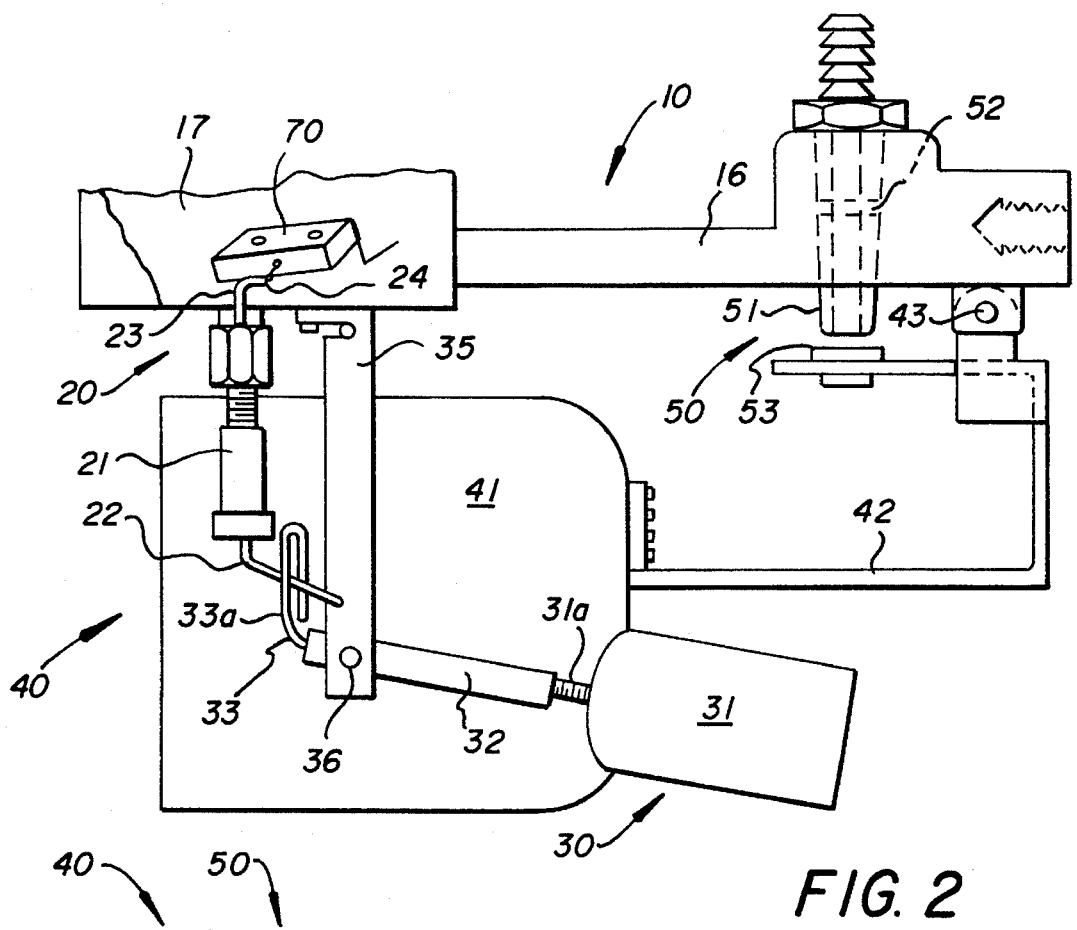
FIG. 2 shows a side view of a first embodiment of an engine oil regulating device according to the invention.
Figure 3:
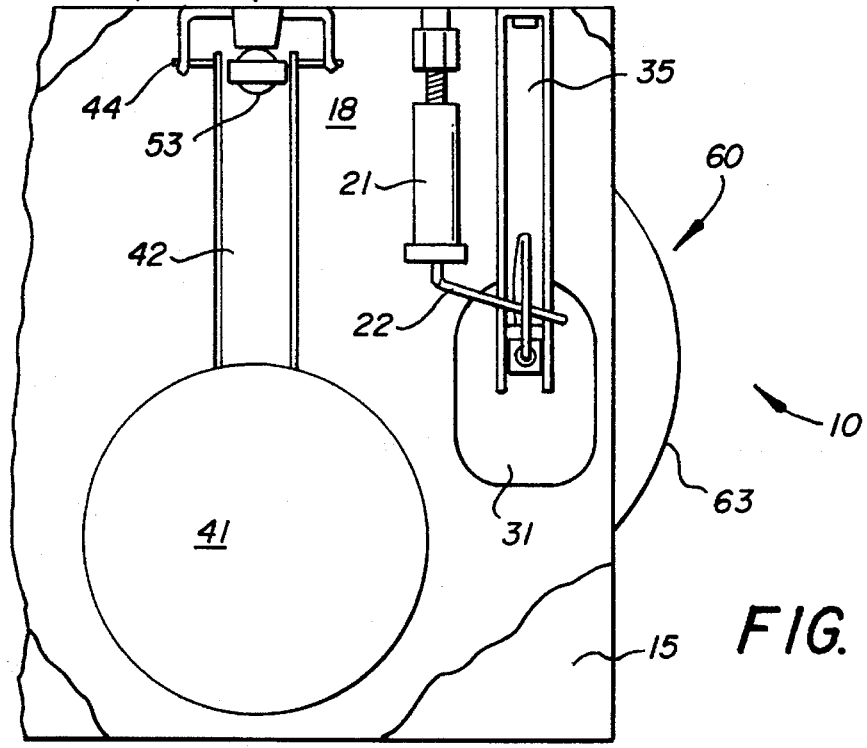
FIG. 3 shows an end view of the engine oil regulating device of FIG. 2.

FIGS. 2 and 3 show a first embodiment of an engine oil regulating device 10, which may include a casing 15 and a casing lid 16 with a switch chamber 17. The casing and casing lid form a housing which surrounds and encloses a float chamber 18. Preferably, a first float 31 and a second float 41 are located in float chamber 18, and are buoyant in a fluid, preferably engine oil. The floats are preferably arranged in a parallel alignment with the first float located 180° from the second float.

The first float may be a part of safety shutdown float element 30 and may be configured as a safety shutdown float 31 with a threaded extension 31a. A float pivot bar 32 is connected along one end to safety shutdown float 31 in any conventional manner, preferably by a threaded connection. A float trip lever 33 is located at the other end of float pivot bar 32.

Preferably, float trip lever 33 is formed from bent wire and includes a slotted portion 33a. Float pivot bar 32 is pivotally connected to a safety shutdown float bracket 35 at pivot point 36 by a threaded fastener or pivot pin. If a threaded fastener is used, threaded portions may be formed in float bracket 35 to receive the threaded fastener.

The engine oil regulating device may also include a safety shutdown mechanism 20 responsive to a sensed condition, such as an unsafe high or low oil level. Safety shutdown mechanism 20 may include a crank arm element 21 having a crank arm 22 extending from one end. Actuator rod 23 may extend from the other end of safety shutdown mechanism 20. Actuator rod 23 may be configured as a bent wire including a switch actuator portion 24 located at a free end of the actuator rod.

The free end of crank arm 22 may pass through and may be surrounded by slotted portion 33a of float trip lever 33. Safety shutdown float 31 rises and falls with the oil level in the float chamber, thereby increasing or decreasing the distance between safety shutdown float and the bottom of the float chamber.

The pivoting connection between the float pivot bar 32 and float bracket 35 constrains float 31 to pivotal motion about pivot point 36 in a vertical plane only. Similarly, slotted portion 33a of the float trip lever is also limited to pivotal motion about pivot point 36 in a vertical plane only. The pivotal motion of the float trip lever 33 causes slotted; portion 33a to contact and engage crank arm 22. Crank arm 22 of the crank arm element is limited to rotational movement in a horizontal plane.

Accordingly, pivotal movement in a vertical plane of float 31 is translated into rotational movement in a horizontal plane of crank arm 22 which is part of crank arm element 21. Crank arm element 21 imparts a rotational movement in a horizontal plane to actuator rod 23. In the event float 31 rises or falls to an unsafe fluid level, the resulting motion of actuator rod 23 permits switch actuator portion 24 to contact and actuate switch 70. According to the preferred embodiment the switch may be a break over switch or snap-acting switch, i.e., any switch that immediately switches from one side to another side after a threshold force is achieved.

Engine oil regulating device 10 includes an oil level regulating float element 40 and an oil level adjustment mechanism 50 according to the preferred embodiment. Oil level regulating float element 40 includes an oil level regulating float 41, which is preferably connected to a float pivot member 42 by threaded fasteners. Float pivot member 42 may be configured in a substantially C-shape having a lower portion connected to float 41 and an upper portion pivotally connected to casing lid 16 at pivot point 43 by pivot pin 44.

Oil level adjustment mechanism 50 includes a fitting or threaded valve element 51, a particle filter 52 and a closure member 53. Threaded valve element 51 is preferably a brass, threaded thumb valve which is adjustably mounted in a threaded orifice located in casing lid 16. Threaded valve element 51 functions as a fluid inlet as oil flows from a gravity supply into the float chamber. It is also within the scope of the invention to provide an oil supply with a pressurized reservoir.

Casing lid 16 also carries particle filter 52 which is located in the path of the oil flowing into the float chamber. Closure member 53 is preferably made of neoprene and is located on an upper portion of float pivot member 42. As the oil level in the float chamber rises, float 41 rises and pivots about pivot point 43. Float 41 continues to rise with the rising oil level until closure member 53 moves into contact with threaded valve element 51 and shuts off the oil flow into float chamber 18.

The oil levels in the float chamber and the engine crankcase may be regulated at the proper times by the cooperation between threaded valve element 51 and closure member 53. Threaded valve element 51 may be adjusted to a lower position in the float chamber, in a manner described in detail below, to lower the maximum oil level in float chamber. In the event that the valve element is raised to a higher level, a higher oil level must be achieved before the valve element and closure member engage and shut off the flow of oil into the float chamber.

FIGS. 4–7 show a second embodiment of an engine oil regulating device 10' according to the invention. As described in connection with the first embodiment, engine oil regulating device 10' includes a casing 15 and a casing lid 16 with a switch chamber 17. The casing and casing lid form a housing that surrounds and encloses float chamber 18. A switch 70 is located in switch chamber 17 (See FIG. 6) and is actuated by a safety shutdown mechanism 80.

Safety shutdown mechanism 80 includes a crank arm element 81 having a substantially L-shaped crank arm 82 extending from one end and an actuator rod 83 extending from the other end. Preferably, actuator rod 83 is connected to a switch actuator bar 84 located at the free end of the actuator rod. The switch actuator bar and the actuator rod may be connected in any conventional joining method such as soldering or gluing. If a joining method is used, it is preferred to weld the actuator bar to the actuator rod.

According to the preferred embodiment, a wire form may be made from a single piece of wire bent at an angle, i.e., 90°, from the rod axis. The bent wire portion forms the actuator bar.

Figure 5A:
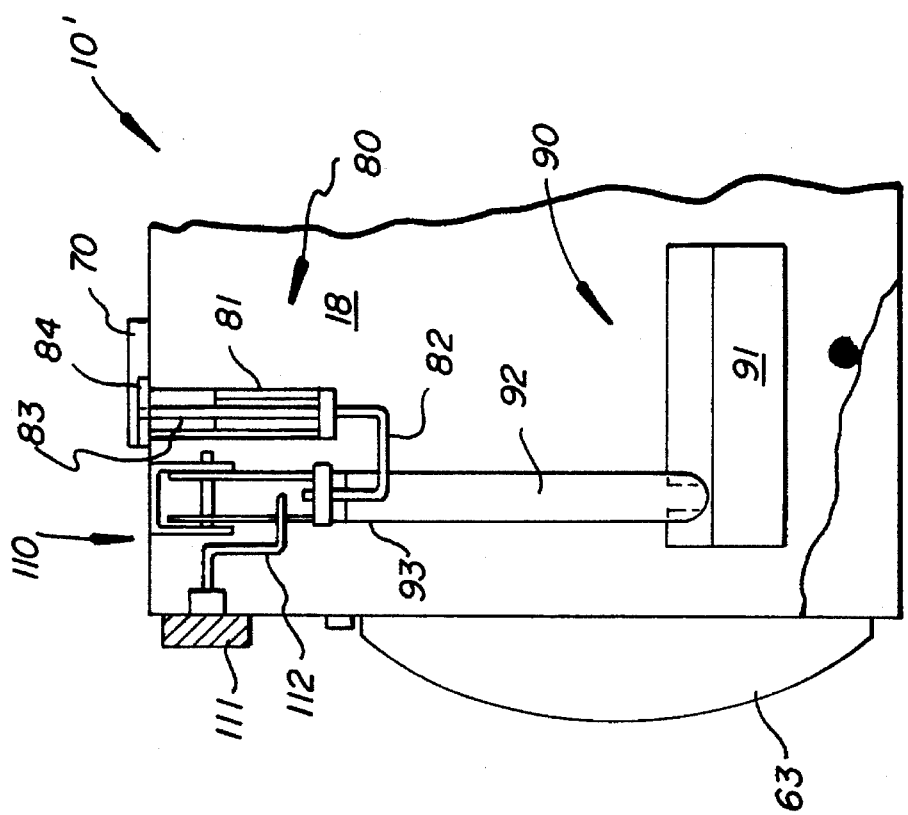
FIG. 5A shows a partial end view of a second embodiment of an engine oil regulating device including a safety shutdown testing mechanism according to the invention.
Figure 4:
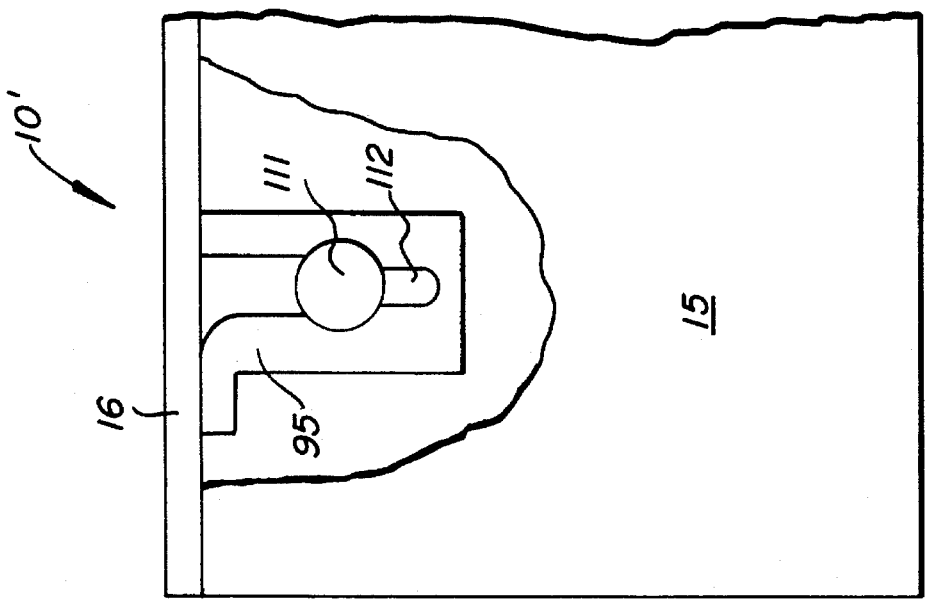
FIG. 4 shows a partial side view of a test knob and casing according to a second embodiment of the invention.
Figure 5B:
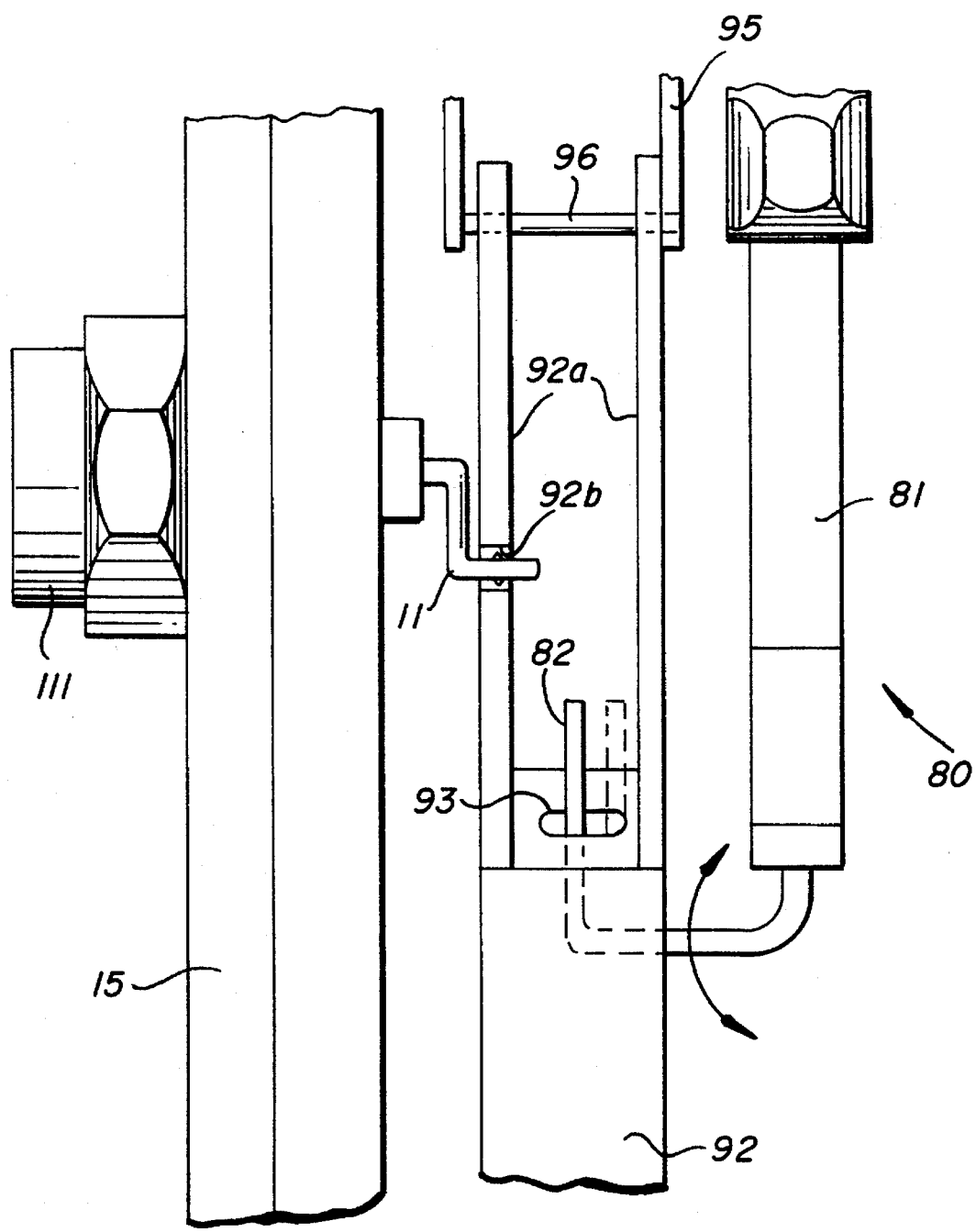
FIG. 5B shows an enlarged end view of the safety shutdown testing mechanism of FIG. 5A.

The second embodiment also includes a safety shutdown testing mechanism 110 as best seen in FIGS. 5A and 5B. Safety shutdown testing mechanism 110 includes a test knob 111 and a test crank arm 112. Preferably, test knob 111 is rotatably mounted on the exterior of casing 15. A first end of test crank arm 112 is fixedly connected to test knob 111. A second end of test crank arm 112 may contact and engage safety shutdown float element 90.

Safety shutdown float element 90 includes a first float or safety shutdown float 91, a float pivot segment 92 and a float bracket 95. Float 91 may be connected to a first end of float pivot segment 92 in any conventional manner, preferably by a threaded fastener. Float pivot segment 92 includes a second end that may terminate into two parallel float pivot extensions 92a. One of float pivot extensions 92a includes a crank arm receiving aperture 92b through which the second end of test crank arm 112 passes. Each of float pivot extensions 92a includes a stop 92c(see FIG. 7) for limiting the downward motion of float 91.

Float bracket 95 may include a substantially C-shaped portion with a base portion connected to casing lid 16 and two vertical portions, which depend downwardly from the base portion. Float pivot segment 92 is pivotally connected to float bracket 95 by a pivot pin 96 which passes through the downwardly extending portions of float bracket 95 and float pivot extensions 92a.

Float pivot segment 92 also includes a slotted portion defining an aperture or slot 93. The free end of crank arm 82 may pass through and may be surrounded by slot 93 of float pivot segment 92. Safety shutdown float 91 rises and falls with the oil level in the float chamber, thereby increasing or decreasing the distance between float 91 and the bottom of the float chamber. Float 91 may only fall to a predetermined position. As float 91 pivots downwardly, float pivot stops 92c contact the base portion of float bracket 95 to limit the downward motion of float 91.

The pivoting connection between the float pivot segment and the float bracket restricts float 91 to pivotal motion about pivot point 96 in a vertical plane only. Similarly, slot 93 of the float pivot segment is also limited to pivotal motion about pivot point 96 in a vertical plane only. Float pivot segment 92 that defines slot 93 pivots about pivot pin 96 and may contact and engage the free end of crank arm 82.

Crank arm 82 of crank arm element 81 is limited to rotational movement in a horizontal plane. Thus, pivotal movement in a vertical plane of float 91 is translated into rotational movement in a horizontal plane of crank arm 82 which is part of crank arm element 81. Crank are element 81 imparts a rotational movement in a horizontal plane to actuator rod 83. In the event float 91 rises or falls to an unsafe fluid level, the resulting motion of actuator rod 83 causes switch actuator bar 84 to contact and actuate switch 70.

Activation of switch 70 may also be activation of safety shutdown testing mechanism 110. Through the second end of test crank are 112 which is received in aperture 92b, rotation of test knob 111 imparts a pivotal motion about pivot pin 96 to float pivot segment 92. Float pivot segment 92 imparts a rotational movement in a horizontal plane to crank arm 82, which is part of crank are element 81. Crank are element 81 imparts a rotational movement in a horizontal plane to actuator rod 83, which in turn causes switch actuator bar 84 to contact and actuate switch 70.

Figure 6:
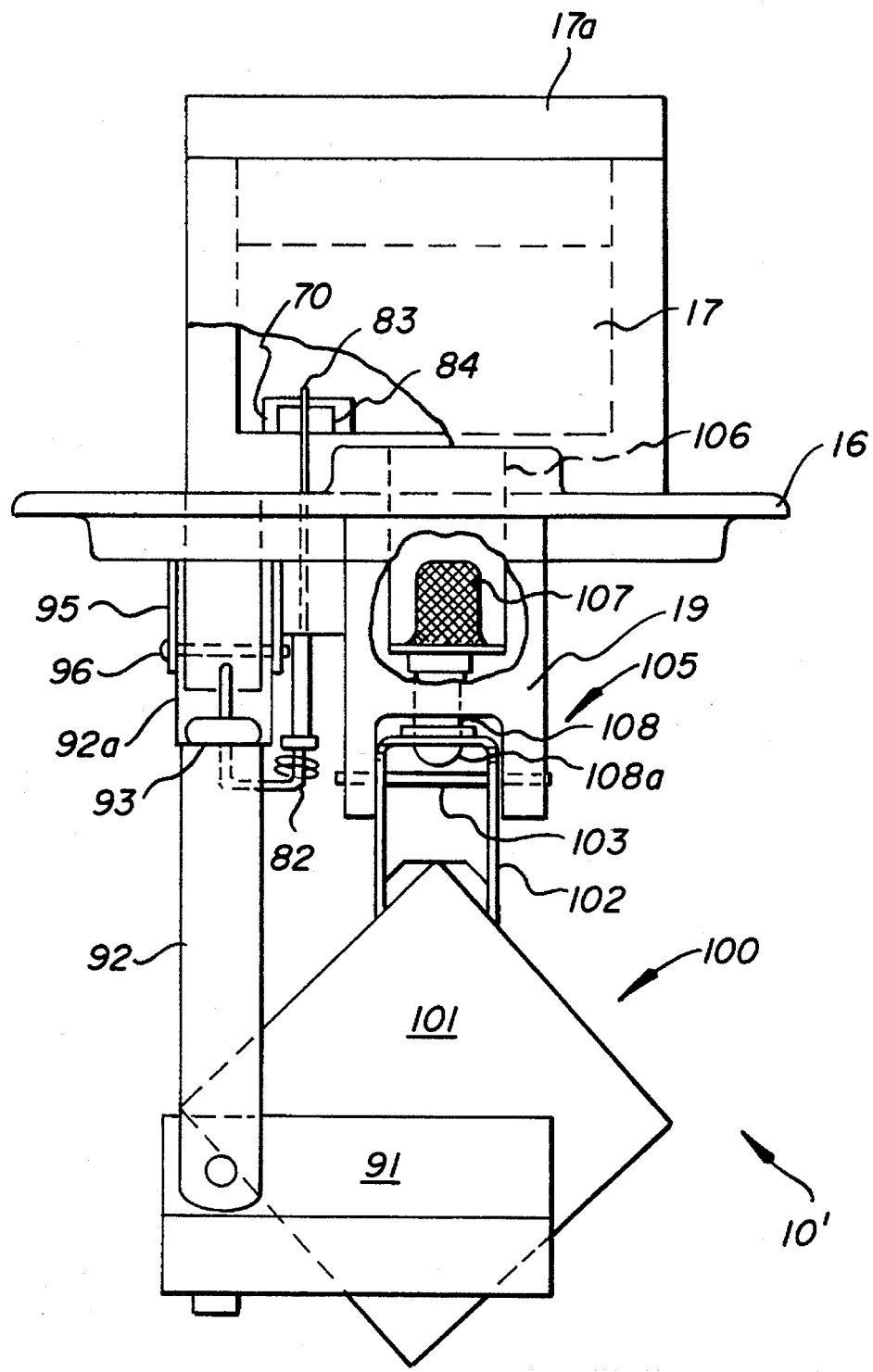
FIG. 6 shows an end view of a float assembly and casing lid of the second embodiment of an engine oil regulating device according to the invention.
Figure 7:
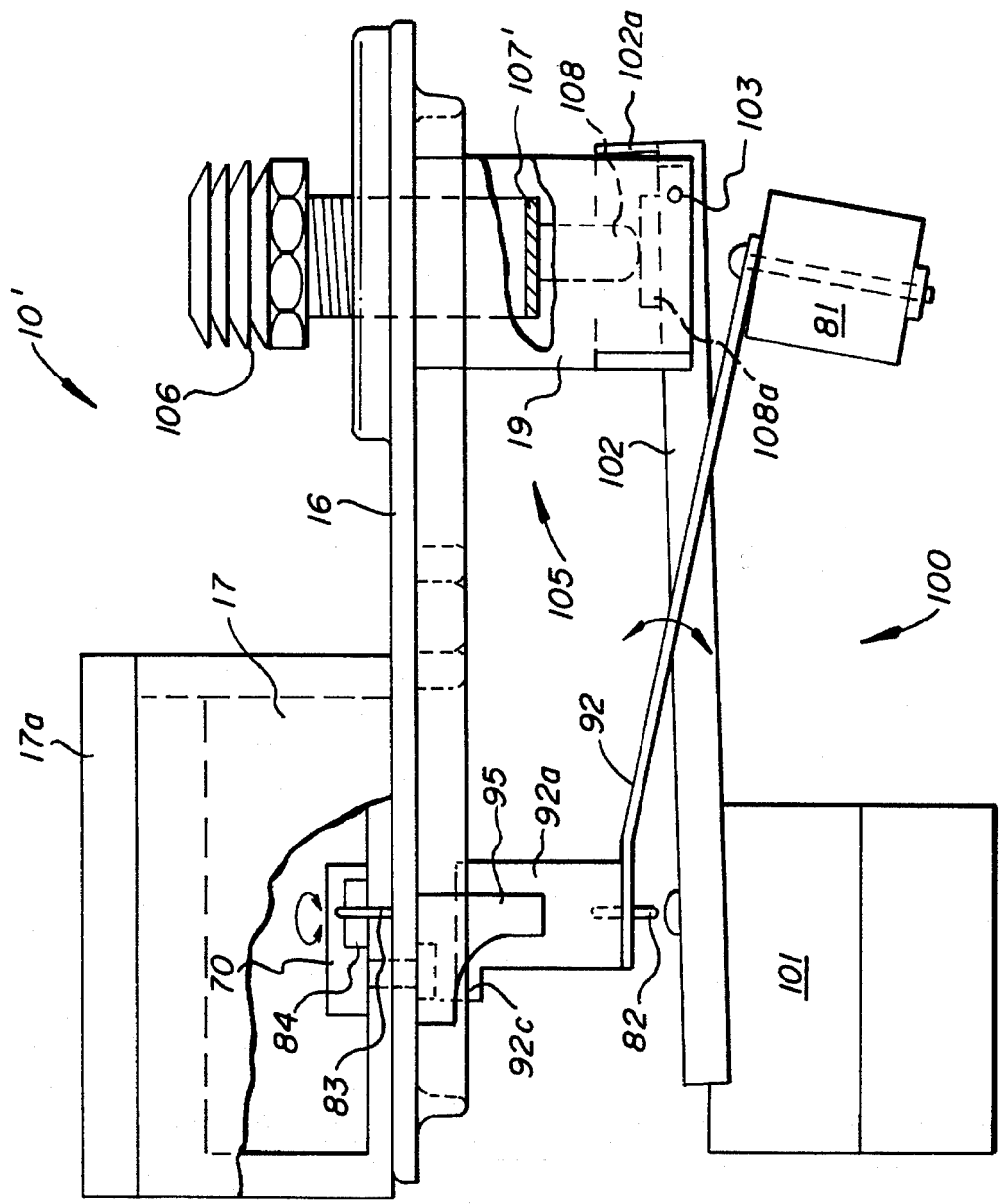
FIG. 7 shows a side view of the float assembly and casing lid of FIG. 6.

Engine oil regulating device 10' also includes an oil level regulating float element 100 and an oil level adjustment mechanism 105 as best shown in FIGS. 6 and 7. According to this embodiment, oil level regulating float element 100 preferably includes oil level regulating float 101 which may be connected to a float pivot member 102 by a threaded fastener. Float pivot member 102 may be configured in a substantially L-shape having an elongated portion connected to float 101 and a rearward extension or stop 102a for limiting the downward motion of float 101.

Oil level adjustment mechanism 105 includes a hose barb 106, a particle filter 107, a fitting or threaded valve element 108, and a closure member 108a. According to the preferred embodiment particle filter 107 is a removable, cone-shaped mesh screen exhibiting a flattened lower portion as shown in FIG. 6. Alternatively, FIG. 7 shows a substantially flat mesh particle filter 107'.

Casing lid 16 includes a casing lid extension 19 having a cut-out portion. Preferably, float pivot member 102 is pivotally connected to casing lid extension 19 by a pivot pin 103 which passes through float pivot member 102 and the cut-out portion of casing lid extension 19.

Threaded valve element 108 is preferably a brass, threaded thumb valve which is adjustably mounted in a threaded orifice located in casing lid extension 19. Threaded valve element 108 functions as a fluid inlet as oil flows from a gravity feed or pressurized oil reservoir into the float chamber. Casing lid extension 19 also carries particle filter 107 which is located in the path of the oil flowing into the float chamber. Closure member 108a is preferably made of neoprene and is located on an upper surface of float pivot member 102.

As the oil level in the float chamber rises, float 101 rises and pivots about pivot pin 103. Float 101 continues to rise with the rising oil level until closure member 108a moves into contact with threaded valve element 108 and shuts off the oil flow into float chamber 18. Thus, the oil level in the float chamber may be regulated at the proper times by the cooperation between threaded valve element 108 and closure member 108a.

As the oil level decreases, float 101 may only fall to a predetermined position. With a decreasing oil level, float 101 pivots downwardly until rearward extension 102a contacts casing lid extension 19. Preferably, float 91 and float 101 are located in float chamber 18, and are buoyant in a fluid, preferably engine oil. The floats are preferably arranged in a parallel alignment with the first float located 180° from the second float.

According to the invention valve element 108 is a threaded element and adjustably mounted in casing lid extension 19 so the crankcase oil level may be easily adjusted. Valve element 108 exhibits a hollow interior that defines a hollow portion shaped to mate with a conventional tool such as a standard size Allen wrench.

When adjusting the valve element, hose barb 106 and particle filter 107 are removed from the casing lid extension. An Allen wrench may be inserted into valve element 108, so screwing the threaded valve element in a clockwise direction into the casing lid extension by about one-quarter inch results in lowering the crankcase oil level maintained by about one inch. Similarly, threaded valve element 108 may be turned in a counterclockwise direction by about one-quarter inch, which results in raising the position of the valve element in the float chamber, while raising the crankcase oil level maintained by about one inch.

This simple and inexpensive oil level adjustment mechanism eliminates the need for relocating the entire regulator assembly when the oil level to be maintained is changed. Further, the oil level adjustment mechanism allows fine tuning of the oil level during initial installation. The oil level adjustment mechanism may operate with about a one-quarter inch diameter orifice up to about 15 psi gage and up to about 60 psi gage with a one-eighth inch diameter orifice in a pressurized reservoir application.

Figure 8:
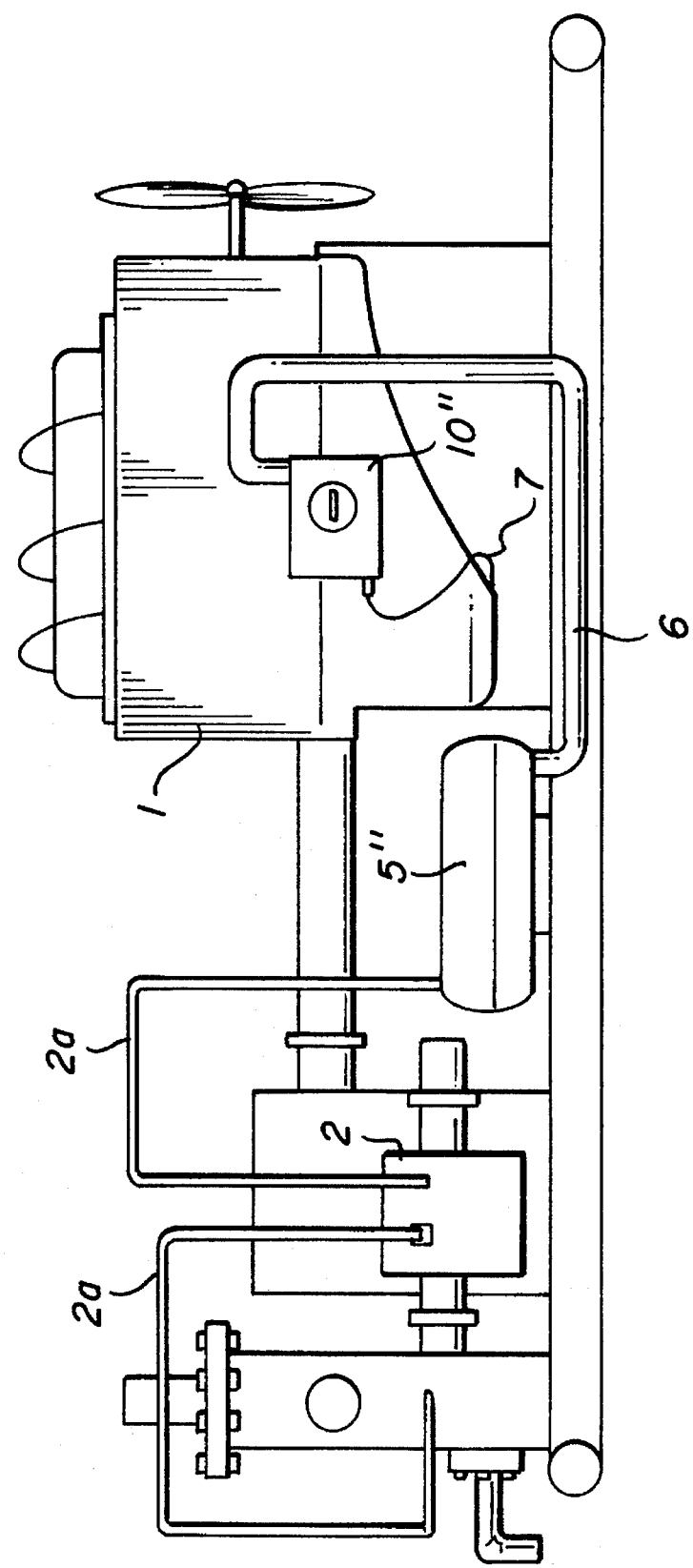
FIG. 8 shows a side view of a stationary engine system with an engine oil regulating device according to the invention configured for a pressurized oil reservoir.

FIG. 8 shows another embodiment of engine oil regulating device 10" according to the invention. According to this embodiment, a stationary engine system may be equipped with a pressurized oil reservoir 5" and engine oil regulating device 10". The stationary engine system includes a stationary engine 1, a compressor 2 with lines 2a and a pressurized oil reservoir 5".

Engine oil regulating device 10" includes an inlet that may be connected to oil reservoir 5" by flow passageway 6. Device 10" also includes an outlet that may be connected to the stationary engine by flow passageway 7. The pressurized oil reservoir configuration affords the system designer with more options than provided with the gravity feed oil reservoir setup shown in FIG. 1. For example, a gravity feed reservoir must be located above the engine oil regulating device so the oil may flow into the regulating device under the force of gravity. In contrast, pressurized reservoir 5" may be located above, below or along side the regulating device.

The pressurized oil reservoir is advantageous in cold weather applications. In cold weather the viscosity of oil increases, which worsens the flowability of the oil. Of course, the viscosity condition of the oil at a given temperature also depends greatly on the weight of the oil used. One can ensure that cold oil will flow at an acceptable rate by pressurizing the engine oil regulator.

Typically, air is used to pressurize the oil, but it is also contemplated to use other conventional gases. The actual pressure applied is transferred equally to the regulating device 10". The preferred pressure range is from about 7 psi gage to about 70 psi gage, although pressures below 7 psi gage and up to about 120 psi gage are also contemplated.

When the required pressure is high, i.e., above 15 psi gage, the resultant force developed at the thumb valve/closure member interface is also high. This higher resultant force (relative to the gravity feed configuration) would require a greater balance force, which is generated by the float buoyancy. For a float with a predetermined size, a greater buoyancy is created when the fluid overtakes a greater portion or surface area of the float. The greater buoyancy force also results in higher regulating device and stationary engine oil levels.

The increased oil levels may be avoided in the pressurized application by replacing the ¼" threaded valve element, which is preferably used in gravity feed applications, with a ⅛" or ¹⁄₁₆" threaded valve element. The reduced diameter valve element effectively reduces the force on the seat or closure member and requires a lower relative balancing force (buoyancy force), so a lower oil level for a given pressure is maintained.

Other advantages of the pressurized oil reservoir configuration over the gravity feed oil reservoir should now become clear to one of ordinary skill in the art. For example, the stationary engine system may have a more compact arrangement, as the oil reservoir is not required to be elevated above the regulating device and engine. Typically, an elevated gravity feed reservoir is separate from the compressor and is less accessible than a pressurized reservoir that may be integral with the compressor and easily accessible to a technician.

A pressurized reservoir configuration may also reduce the amount of required plumbing, as the hose or flow passageway lengths may be greatly reduced. Hard plumbing such as steel tubing may be advantageously used. Steel tubing provides many advantages over the less expensive flexible tubing used in many gravity feed configurations.

Steel tubing is less likely to be pinched, cut or melted. Further, steel tubing is less likely to deteriorate from exposure to the weather. Thus, the pressurized reservoir configuration and use of reduced length steel tubing minimizes the risks of fire and leaks, while increasing the longevity and reliability of the stationary engine system.

FIGS. 9A through 9D illustrate the preferred embodiment for the switch assembly. A single switch 70 including a switch actuator arm 71 is located in switch chamber 17, which is defined by a cylindrical wall 16a. Cylindrical wall 16a may include a threaded aperture 16b. Wiring from the switch to a power source (not shown) and to a switch enclosure such as an ignition cut-off switch (not shown) pass through threaded aperture 16b.

Preferably, cylindrical wall 16a is thickened to form an explosion-proof chamber. The explosion-proof chamber is completely enclosed as a thickened closing member 17a having a threaded portion may be releasably connected to a threaded portion of cylindrical wall 16a as best seen in FIGS. 6 and 7. It is advantageous to provide an explosion-proof chamber as sparks may result from the switch actuation. For example, an arc of varying degree, depending on the unique circuit voltage, may result from opening an energized electrical circuit through a contact set within the safety shutdown switch mechanism.

Figures 9A, 9B, 9C:
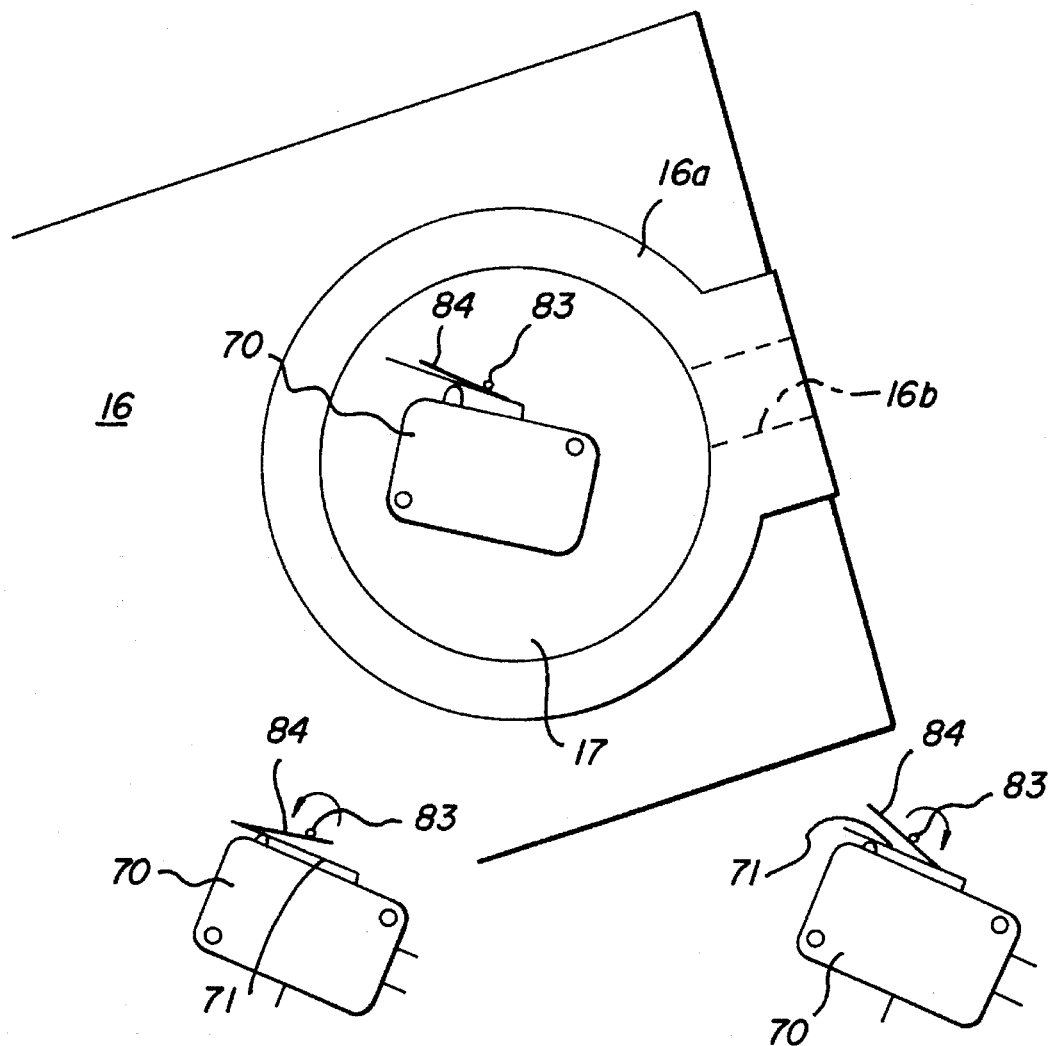
FIG. 9A shows a top view of a single-switch embodiment of a safety shut-down switch mechanism according to the invention, in a rest position.
FIG. 9B shows a top view of the safety shutdown switch mechanism of FIG. 9A in an activated position due to an unsafe high fluid level.
FIG. 9C shows a top view of the safety shutdown switch mechanism of FIG. 9A in the activated position due to an unsafe low fluid level.

FIG. 9A shows the switch actuator arm located parallel to the switch actuator bar, thus the switch has not been activated as the oil levels in the float chamber and crankcase are at a normal level. FIG. 9B shows the switch 70 in an activated position due to an unsafe high oil level as actuator rod 83 and switch actuator bar 84 have rotated in a counterclockwise direction (as indicated by the arrow) to depress switch actuator arm 71.

FIG. 9C shows the switch 70 in an activated position due to an unsafe low oil level. Actuator rod 83 and switch actuator bar 84 may rotate in a clockwise direction (as indicated by the arrow) to depress switch actuator arm 71.

Actuation of switch 70 due to an unsafe high fluid level or an unsafe low fluid level is electrically identical as switch actuator arm 71 is in the same position as shown in FIGS. 9A and 9B. Due to identical electrical configurations for high and low level shutdowns when using a single switch, the cause of the shutdown or alarm cannot be determined at a remote location.

According to the invention, the engine oil regulating device may provide a switch assembly for a tattletale application. In a tattletale application a plurality of switches may be used; the switch assembly may be connected to a control panel (not shown) which reveals the precise reason for alarm or shutdown, i.e., high fluid level or low fluid level. The control panel may also show switch actuation by the safety shutdown testing mechanism.

FIGS. 10A through 10C show a stacked dual switch assembly 120 including upper switch 121 and lower switch 122. The stacked dual switch assembly may be used when the permissible radius or width of the engine oil regulating device, and more particularly the radius or width of the switch chamber, is constrained by radial or width limitations regarding the engine oil regulating device installation.

Preferably, switch 121 is located directly above switch 122. As best seen in FIGS. 10B and 10C, upper switch 121 includes upper switch actuator arm 121a and lower switch 122 includes lower switch actuator arm 122a. FIG. 10D shows an embodiment of the actuator bar/rod mechanism for use with the stacked switch embodiment that includes actuator rod 123, upper switch actuator bar 124 and lower switch actuator bar 125.

Figure 10E:
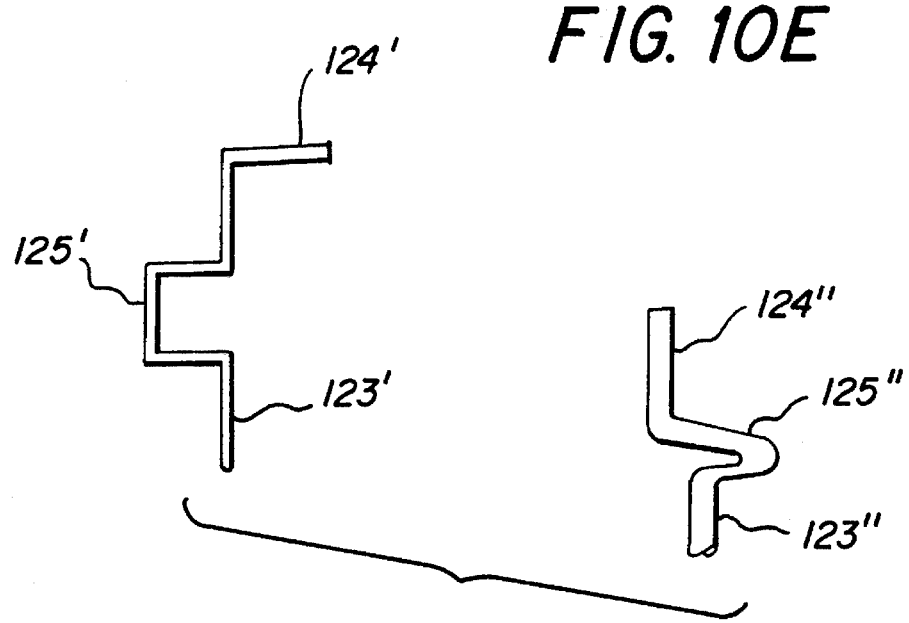
FIG. 10E shows partial side views of preferred embodiments of an actuator rod and switch actuator bars of the safety shutdown switch mechanism.

Due to Applicants' unique configuration for the stacked switches, lower switch actuator bar 125 is preferably about one-half of the length of upper switch actuator bar 124. FIG. 10E shows two additional embodiments of the actuator bar/rod mechanism, which is preferably configured as a wire form made from a single piece of wire.

For a normal fluid level, the upper switch actuator bar is substantially parallel to the upper switch actuator arm, and the lower switch actuator bar is substantially parallel to the lower switch actuator arm in rest positions. FIG. 10B shows actuator rod 123 after a counterclockwise rotation (see arrow indicating the direction of rotation) due to an unsafe high fluid level. As lower switch 122 is configured to send a signal to the control panel upon detection of an unsafe high fluid level, lower switch 122 is activated.

FIG. 10C shows actuator rod 123 after a clockwise rotation (see arrow indicating the direction of rotation) due to an unsafe low fluid level. Upper switch 121 is activated and may send a signal to the control panel upon detection of an unsafe low fluid level.

Activation of switches 121, 122 may also be achieved by actuation of safety shutdown testing mechanism 110. Counterclockwise rotation of test knob 111 results in activation of lower switch 122. Likewise, clockwise rotation of test knob 111 results in activation of upper switch 121.

FIG. 10D shows a partial side view of actuator rod 123 connected to upper switch actuator bar 124 and lower switch actuator bar 125. Actuator bars 124, 125 may be connected to actuator rod 123 in any conventional fashion such as soldering or gluing. The actuator bars may be configured as thin plates, which may also be welded to actuator rod 123.

FIG. 10E shows two additional embodiments of the actuator bar/rod mechanism. According to FIG. 10E, the actuator rod and actuator bars are preferably a wire form made from a single piece of wire bent at an angle, i.e., 90°, from the rod axis. The bent wire portions form the actuator bars. One embodiment shows actuator rod 123', upper switch actuator bar 124' and lower switch actuator bar 125'. The other embodiment shows actuator rod 123", upper switch actuator bar 124" and lower switch actuator bar 125". The angular bend defining lower switch actuator bar 125" may form an acute angle.

Using a plurality of switches makes it possible to determine the cause of the equipment shutdown and/or alarm at a location remote from the oil field machinery. In the event of an unsafe high fluid level, lower switch 122 generates and sends a signal to a control panel at a remote location. Likewise, upon detection of an unsafe low fluid level, upper switch 121 generates and sends a signal to a control panel at a remote location.

Figure 11A:
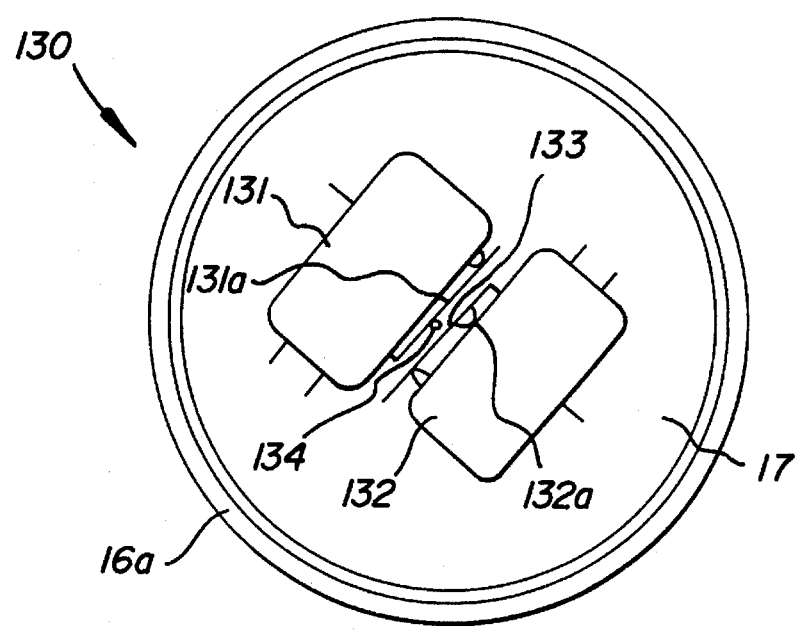
FIG. 11A shows a top view of a first embodiment of a side-by-side two-switch element of a safety shutdown switch mechanism according to the invention, in a rest position.
Figure 11B:
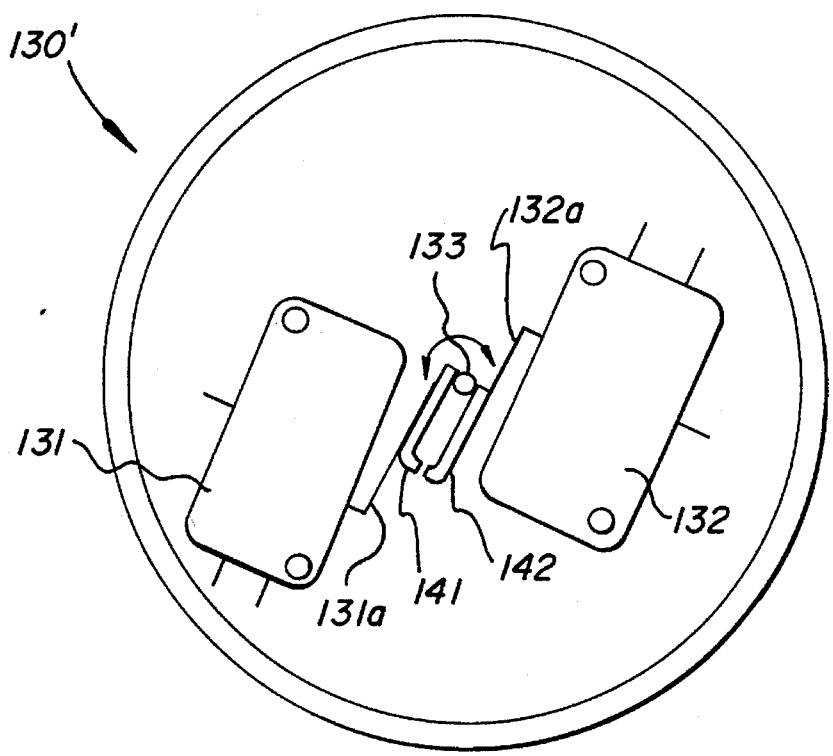
FIG. 11B shows a top view of a second embodiment of a side-by-side two-switch element of a safety shutdown switch mechanism according to the invention, in a rest position.
Figure 11C:
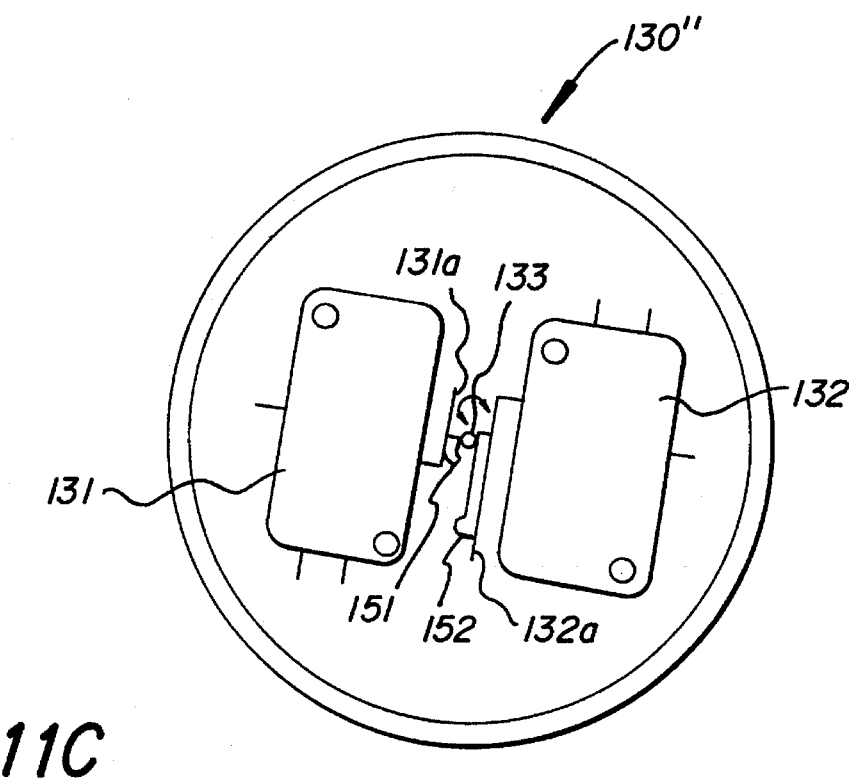
FIG. 11C shows a top view of a third embodiment of a side-by-side two-switch element of a safety shutdown switch mechanism according to the invention, in a rest position.

FIGS. 11A through 11C show different embodiments of a side-by-side dual switch assembly including left switch 131 and right switch 132. Typically, a side-by-side dual switch assembly is used when the height of the engine oil regulating device, and more particularly the height of the switch chamber, is constrained by height limitations regarding the engine oil regulating device installation.

In a side-by-side assembly left switch 131 is aligned within or substantially within the same plane as right switch 132. Use of the side-by-side dual switch assembly also makes it possible to determine the cause, i.e., high or low level detection, of the shutdown and/or alarm at a remote location.

Switch assembly 130 is designed for installations with severe radial or width limitations. In contrast to the stacked dual switch assembly, a single switch actuator bar may be utilized to actuate both switches 131, 132 according to the embodiment illustrated in FIG. 11A. Switch actuator bar 134 may be welded to actuator rod 133, or may be connected in another conventional manner such as soldering or gluing. It is preferred to configure the switch actuator rod as a single piece of wire with a bent free end forming the switch actuator bar.

For a normal fluid level, switch actuator bar 134 is substantially parallel to both left switch actuator arm 131a and right switch actuator arm 132a as shown in FIG. 11A. In the event of an unsafe high fluid level, actuator rod 133 rotates in a counterclockwise direction so switch actuator bar 134 depresses right switch actuator arm 132a to activate right switch 132. Right switch 132 is configured to send a signal to the control panel upon detection of an unsafe high fluid level.

In the event of unsafe low fluid level, actuator rod 133 rotates in a clockwise direction so switch actuator bar 134 depresses left switch actuator arm 131a to activate left switch 131. Left switch 131 is configured to send a signal to the control panel upon detection of an unsafe low fluid level. Use of a plurality of switches in the side-by-side dual switch assembly also makes it possible to determine the cause of the equipment shutdown at a location remote from the oil field machinery.

FIGS. 11B and 11C show different embodiments of a side-by-side dual switch assembly. Both embodiments are designed for installations with less severe radial or width limitations than those limitations accommodated by the design illustrated in FIG. 11A. Of the side-by-side embodiments, switch assembly 130' is designed for the least severe radial or width limitations. Accordingly, the actuator bar/rod element may include two actuator bars.

Switch assembly 130' includes actuator rod 133, left switch actuator bar 141 and right switch actuator bar 142. Preferably, switch bars 141, 142 are of approximately the same length and are bent slightly inwardly along the free end.

FIG. 11C shows side-by-side dual switch assembly 130" is designed for intermediate radial or width limitations. The actuator bar/rod element is also configured with two actuator bars. However, the switches are displaced a lesser amount in the longitudinal direction than the switches according to switch assembly 130'. Further, the switches of switch assembly 130" are laterally spaced a lesser distance than the switches according to switch assembly 130'.

Dual switch assembly 130" includes actuator rod 133, left switch actuator bar 151 and right switch actuator bar 152. According to this embodiment, left switch actuator bar 151 is less than one-fourth the length of right switch actuator bar 152. Dual switch assemblies 130', 130" operate in a substantially similar fashion as described above regarding dual switch assembly 130.

Figure 12A:
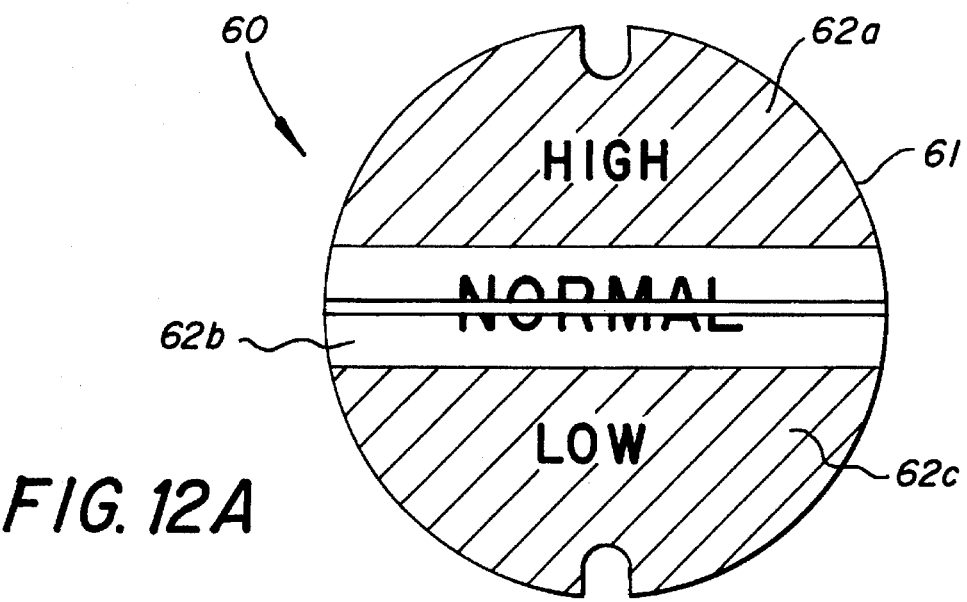
FIG. 12A shows a side view of a first embodiment of a multicolored element of a visual indicator according to the invention.

FIG. 12A shows a first embodiment of a fluid level visual indicator 60 according to the invention. Fluid level visual indicator 60 may be a multicolored element 61 and bezel covering 63 (see FIGS. 3 and 4) connected to the housing. Multicolored element 61 may include a first colored portion 62a indicating an unsafe high fluid level, a second colored portion 62b indicating a normal fluid level and a third colored portion 62c indicating an unsafe low fluid level.

Visual indicia such as "HIGH,""NORMAL" and "LOW" may be depicted in black letters located on portions 62a, 62b, 62c, respectively. The unsafe high and low fluid portions 62a, 62c may include alternating zones of red and white angled strips. Normal fluid portion 62b includes a green and white background.

Figure 12B:
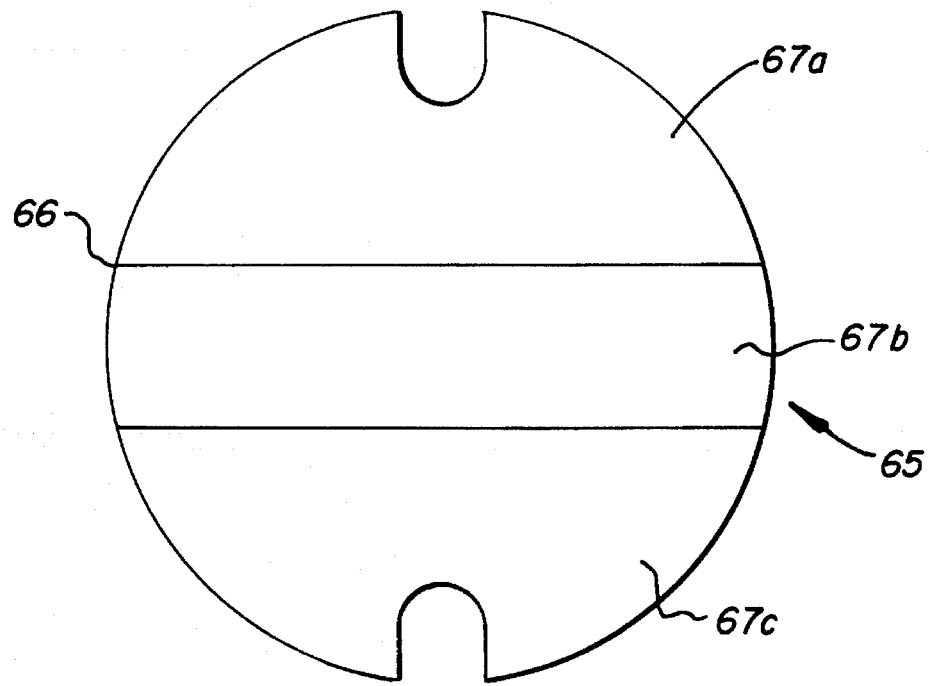
FIG. 12B shows a side view of a second embodiment of a multicolored element of a visual indicator according to the invention.

FIG. 12B shows a second or preferred embodiment of a fluid level visual indicator 65. Fluid level visual indicator 65 may be a multicolored element 66 and bezel covering 63 (see FIGS. 3 and 4) connected to the housing. Multicolored element 66 may include a first colored portion 67a indicating an unsafe high fluid level, a second colored portion 67b indicating a normal fluid level and a third colored portion 67c indicating an unsafe low fluid level. The unsafe high and low fluid portions 67a, 67c may include a solid white background. Normal fluid portion 67b may include a solid green background.

According to the preferred embodiment, the housing of the engine oil regulating device has a $7\frac{3}{16}$" length×$4\frac{15}{16}$" width×$6\frac{1}{2}$" height substantially rectangular configuration. Preferably, casing lid 16 is made of nylon or die-cast aluminum and casing 15 is made of glass filled nylon or die-cast aluminum. The floats may be formed from rigid, closed cell polyurethane foam with a vinyl ester coating.

As stated above, it is within the scope of the invention to configure the regulator as an "ABS"-type engine oil regulator that provides an alarm before shutdown due to a rising or falling fluid level. For example, the actuator bar/rod mechanism as set forth in FIG. 10E may be modified so upper switch actuator bar and lower switch actuator bar are aligned on the same side of actuator rod.

One switch actuator bar is preferably about 1½–3 times longer than the other switch actuator bar in an "ABS"-type regulator. The longer switch actuator bar triggers the switch that initiates an alarm and the shorter switch actuator bar triggers the switch that initiates a safety shutdown. The actuator bar/rod mechanism may be configured so a greater length differential between the bars results in an earlier alarm before shutdown.

It may be desired to monitor four conditions, i.e., alarm before unsafe high fluid level shutdown, alarm before unsafe low fluid level shutdown, unsafe high fluid level shutdown, and unsafe low fluid level shutdown. All four conditions may be monitored with a regulator having four switches and an actuator bar/rod mechanism that has four bar positions, or preferably, two regulators, each having two switches, may be used.

In operation, safety shutdown testing mechanism 110 operates a dual switch assembly as follows. Rotation of test knob 111 in a counterclockwise direction causes test crank arm 112 and float pivot segment 92 to rotate in a counterclockwise direction. Float pivot segment moves the free end of crank arm 82 and activates the high fluid level and/or alarm circuits. Likewise, clockwise rotation of test knob 111 causes test crank arm 112 and float pivot segment 92 to rotate in a clockwise direction. Thus, float 91 is forced to overcome its buoyancy and is driven into the oil. Float pivot segment moves the free end of crank arm 82 and activates the low fluid level and/or alarm circuits.

In the event a single switch is used, the high and low fluid levels are electrically identical (see FIGS. 9B and 9C). Thus, the alarm and/or shutdown circuits are activated, but the cause of the alarm and/or shutdown, i.e., high or low fluid level, cannot be determined at a remote location.

The illustrated embodiments are shown by way of example. The spirit and scope of the invention is not to be restricted by the preferred embodiment shown.

We claim:

1. A remote fluid level monitoring and regulating device comprising:

a housing in fluid communication with a monitored space;

a float chamber located within said housing and separated from said monitored space;

a multiple float system at least comprising:

a first float element located within said float chamber sensing a fluid level in said float chamber and said first float element cooperating with a valve to control fluid level in said float chamber; and a second float element located within said float chamber sensing said fluid level in said float chamber; and a safety shutdown/alarm element responsive to said fluid level sensed by said second float element.

2. A fluid level monitoring and regulating device according to claim 1 further comprising:

a safety shutdown/alarm testing element exhibiting an adjustable knob and connected to said safety shutdown element.

3. A fluid level monitoring and regulating device according to claim 1 further comprising:

a fluid level visual indicator in fluid communication with said monitored space, including a multicolored element and connected to said housing, said multicolored element exhibiting a first colored portion indicating an unsafe high fluid level, a second colored portion indicating a normal fluid level and a third colored portion indicating an unsafe low fluid level.

4. A fluid level monitoring and regulating device according to claim 1 further comprising:

an adjustable fluid level regulating element, said adjustable fluid level regulating element comprising at least:

an adjustable threaded valve member connected to said housing; and a valve sealing member connected to said first float element.

5. A fluid level monitoring and regulating device according to claim 1 further comprising:

a fluid inlet configured so said monitoring and regulating device receives fluid from a gravity feed fluid reservoir located above said device.

6. A fluid level monitoring and regulating device according to claim 1 further comprising:

a fluid inlet configured so said monitoring and regulating device receives fluid from a pressurized fluid reservoir.

7. A fluid level monitoring and regulating device according to claim 1, wherein said safety shutdown/alarm element exhibits at least one switch for electrically signalling a shutdown/alarm condition.

8. A fluid level monitoring and regulating device according to claim 7, wherein said at least one switch includes a first switch and a second switch in a stacked configuration.

9. A fluid level monitoring and regulating device according to claim 7, wherein said at least one switch includes a first switch and a second switch in a side-by-side configuration.

10. An engine oil regulating device comprising:

a housing in fluid communication with an engine crankcase;

a float chamber defined within said housing;

first and second floats in said float chamber;

an electro-mechanical safety shutdown/alarm switch responsive to said second float in said float chamber and signalling a safety shutdown/alarm condition of an engine;

a valve located within said float chamber responsive to said first float and regulating an oil level within said float chamber; and an adjustable test knob connected to a test arm positionable against a float arm for forcing actuation of said electro-mechanical safety shutdown/alarm switch.

11. An engine oil regulating device according to claim 10, wherein said electro-mechanical safety shutdown/alarm switch further comprises:

a shutdown switch, and a shutdown switch actuator exhibiting a crank arm.

12. An engine oil regulating device according to claim 11, wherein said second float exhibits a float arm having a slotted portion and said shutdown/alarm switch actuator crank arm is surrounded by said float arm slotted portion.

13. An engine oil regulating device according to claim 10 further comprising an oil level adjuster connected to said housing.

14. An engine oil regulating device according to claim further comprising:

a fluid inlet in said housing connected to a fluid reservoir at a higher level than said housing.

15. An engine oil regulating device according to claim 10 further comprising:

a fluid inlet in said housing connected to a pressurized fluid reservoir.

16. An engine oil regulating device according to claim 10, wherein said electro-mechanical safety shutdown/alarm switch includes a first switch and a second switch in a stacked configuration.

17. An engine oil regulating device according to claim 10, wherein said electro-mechanical safety shutdown/alarm switch includes a first switch and a second switch in a side-by-side configuration.

18. A fluid level regulating and signal sending device comprising:

a housing in fluid communication with and remote from a monitored fluid reservoir, and exhibiting a fluid chamber and a fluid inlet;

a first sensor responsive to a fluid level in said fluid chamber;

a second sensor independent of said first sensor comprising at least a float movably mounted in said fluid chamber responsive to said fluid level in said fluid chamber;

a fluid level visual indicator in fluid communication with said housing;

a closure valve located at said fluid inlet and responsive to said first sensor;

a mechanically actuated safety shutdown/alarm element responsive to said float detecting a fluid level outside a predetermined range, said safety shutdown element including signal sending means for sending a shutdown/alarm signal to a remote location.

19. A fluid level regulating and signal sending device according to claim 18, wherein said first sensor comprises at least a float movably mounted in said fluid chamber.

20. A fluid level regulating and signal sending device according to claim 18, wherein said fluid level visual indicator comprises at least a multicolored element exhibiting a first colored portion indicating an unsafe fluid level and a second colored portion indicating a normal fluid level.

21. A fluid level regulating and signal sending device according to claim 20, wherein said first colored portion of said fluid level visual indicator exhibits a first segment indicating an unsafe high fluid level and a second segment indicating an unsafe low fluid level.

22. A fluid level regulating and signal sending device according to claim 18, wherein said closure valve is an adjustably mounted closure valve.

23. A fluid level regulating and signal sending device according to claim 18 further comprising:

a fluid inlet in said housing connected to a fluid reservoir located above said housing.

24. A fluid level regulating and signal sending device according to claim 18 further comprising:

a fluid inlet in said housing, connected to a pressurized fluid reservoir.

25. A fluid level regulating and signal sending device according to claim 18, wherein said safety shutdown/alarm element comprises at least one switch.

26. A fluid level regulating and signal sending device according to claim 25, wherein said at least one switch includes a first switch element and a second switch element in a stacked configuration.

27. A fluid level regulating and signal sending device according to claim 25, wherein said at least one switch includes a first switch element and a second switch element in a side-by-side configuration.

28. An engine oil regulating device comprising:

a housing in fluid communication with an engine crankcase;

a float chamber defined within said housing;

an electro-mechanical safety shutdown/alarm switch connected to said housing for causing a safety shutdown of an engine;

a float system located within said float chamber for actuating said safety shutdown/alarm switch and for regulating an oil level within said float chamber;

said float system includes at least an oil level regulating float connected to an inlet valve to admit oil to said crankcase through said housing when and only when oil level in said housing falls below a first predetermined level, and a safety shutdown/alarm float independent of said oil level regulating float connected to said electro-mechanical safety shutdown switch when oil level in said housing falls below a second predetermined level; and a test actuator mechanism configured to manually actuate said electro-mechanical switch independent of an oil level in said housing.

* * * * *